United States Patent
Zhu et al.

(10) Patent No.: US 9,997,176 B1
(45) Date of Patent: Jun. 12, 2018

(54) ACTIVATING A MAGNETIC WRITER TO RECOVER FROM READ ERRORS DUE TO READER INSTABILITY

(71) Applicant: Seagate Technology LLC, Cupertino, CA (US)

(72) Inventors: Wenzhong Zhu, Apple Valley, MN (US); Jason C. Jury, Apple Valley, MN (US); Alfredo Sam Chu, Prior Lake, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days. days.

(21) Appl. No.: 15/791,844

(22) Filed: Oct. 24, 2017

Related U.S. Application Data (60) Provisional application No. 62/412,505, filed on Oct. 25, 2016.

(51) Int. Cl.
*G11B 27/36* (2006.01)
*G11B 5/012* (2006.01)
*G11B 20/18* (2006.01)
*G11B 5/00* (2006.01)

(52) U.S. Cl.
CPC .............. *G11B 5/012* (2013.01); *G11B 20/18* (2013.01); *G11B 2005/0021* (2013.01)

(58) Field of Classification Search
CPC ........... G11B 5/012; G11B 27/36; G11B 5/02; G11B 2220/20; G11B 20/18; G11B 2005/0021; G11B 2005/0005
USPC .......................................... 360/25, 31, 53, 59
See application file for complete search history.

(56) References Cited

U.S. PATENT DOCUMENTS

| | | | |
|---|---|---|---|
| 5,189,566 A | 2/1993 | Christensen et al. | |
| 6,249,394 B1 | 6/2001 | Li et al. | |
| 9,424,879 B1 * | 8/2016 | Li | G11B 20/1217 |
| 2008/0186617 A1 | 8/2008 | Hosono et al. | |

* cited by examiner

*Primary Examiner* — Nabil Hindi
(74) *Attorney, Agent, or Firm* — Hollingsworth Davis, LLC (57) ABSTRACT

A recording medium is written to using an energy source that heats the medium during the writing. A read error in a sector is determined when reading via a read transducer. While traversing a part of the recording medium that includes data, a write coil is activated before attempting to re-read the sector. The energy source does not heat the recording medium sufficiently to change a state of the data during the activation of the write coil. The activation of the write coil removes a magnetic instability of the read transducer.

20 Claims, 7 Drawing Sheets

ACTIVATING A MAGNETIC WRITER TO RECOVER FROM READ ERRORS DUE TO READER INSTABILITY

This application claims the benefit of Provisional Patent Application No. 62/412,505 filed on Oct. 25, 2016, which is incorporated herein by reference in its entirety.

SUMMARY

The present disclosure is directed to activating a magnetic writer to recover from read errors due to reader instability. In one embodiment, a recording medium is written to using a read/write head with an energy source that heats the medium during the writing. A read error in a sector is determined when reading via a read transducer of the read/write head. While traversing a part of the recording medium that includes data, a write coil of the read/write head is activated before attempting to re-read the sector. The energy source does not heat the recording medium sufficiently to change a state of the data during the activation of the write coil. The activation of the write coil removes a magnetic instability of the read transducer.

These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures.

DETAILED DESCRIPTION

The present disclosure generally relates to data storage devices that utilize magnetic storage media, e.g., disks. Data storage devices described herein may use a particular type of magnetic data storage known as heat-assisted magnetic recording (HAMR), also referred to as energy-assisted magnetic recording (EAMR), thermally-assisted magnetic recording (TAMR), and thermally-assisted recording (TAR). This technology uses an energy source such as a laser to create a small hotspot on a magnetic disk during recording. The heat lowers the magnetic coercivity at the hotspot, allowing a write transducer to change magnetic orientation, after which the hotspot is allowed to rapidly cool. Due to the relatively high coercivity of the medium after cooling, the data is less susceptible to data errors due to thermally-induced, random fluctuation of magnetic orientation known as the superparamagnetic effect.

A HAMR device uses a near-field transducer to concentrate optical energy into a hotspot in a recording layer. The hotspot raises the media temperature locally, reducing magnetic coercivity therefore reducing the writing magnetic field required for high-density recording. A waveguide integrated into a read/write head can be used to deliver light to the near-field transducer. Light from a light source, such as an edge-emitting laser diode, is coupled into the waveguide through waveguide input coupler or a spot size converter. The light source may be mounted to an outside surface of the read/write head.

This disclosure describes techniques used to deal with instability when reading back recorded data. In a HAMR drive, reader instability has been found to be induced in some cases by previously-occurring write operations. This instability can increase bit error rate (BER) during reading, sometimes to such an extent that a sector fails to converge. This triggers directed error recovery procedures. If these procedures can't recover the sector, the drive may be considered as having failed (e.g., drives used in enterprise applications). One way that a directed recovery procedure may try to recover the bad sector is thermal annealing. However, thermal annealing may not be effective in cases where reader instability is induced by magnetic fields affecting the reader from previous writing operations.

In embodiments describe below, when a read error occurs, the read/write head writes with a small (or zero) laser power in an attempt to change reader state. For example, a bias current that sets the laser ready to write but does not induce lasing may be applied during this writing operation. During the writing operation, a current is applied to the magnetic writer (e.g., write coil) which causes it to produce a magnetic field. Because the laser power is small, data will not be erased by the magnetic field. The magnetic field produced by the writing operation can re-stabilize the reader, after which the data that failed to be read can be re-read. Because this procedure does not need more than one full revolution to perform this writer activation and re-read the data, the procedure doesn't take a significant amount of additional time.

Figure 1:
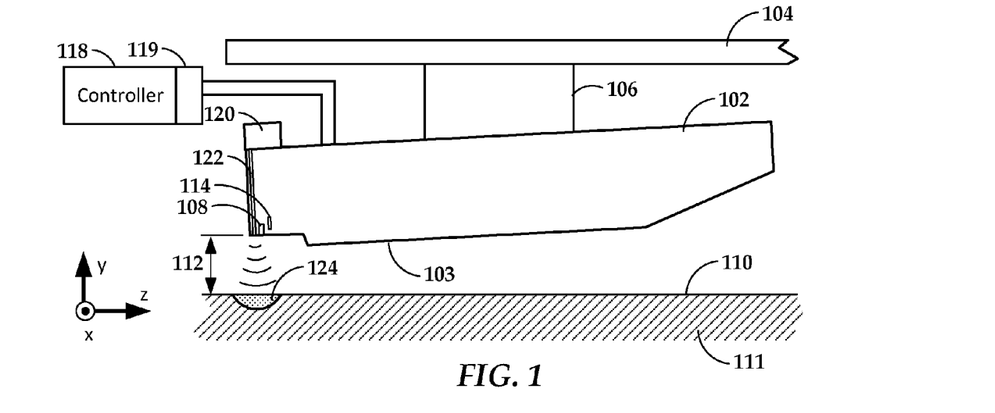
FIG. 1 is a view of a slider assembly according to an example embodiment.

In FIG. 1, a block diagram shows a side view of a HAMR read/write head 102 according to an example embodiment. The read/write head 102 may also be referred to herein as a slider, write head, read head, recording head, etc. The read/write head 102 is coupled to an arm 104 by way of a suspension 106, e.g., a gimbal. The read/write head 102 includes read/write transducers 108 at a trailing edge that are held proximate to a surface 110 of a magnetic recording medium 111, e.g., a magnetic disk. When the read/write head 102 is located over surface 110 of recording medium 111, a flying height 112 is maintained between the read/write head 102 and the surface 110 by a downward force of arm 104. This downward force is counterbalanced by an air cushion that exists between the surface 110 and an air bearing surface (ABS) 103 (also referred to herein as a "media-facing surface") of the read/write head 102 when the recording medium 111 is rotating.

In order to provide control of the clearance between the read/write transducers 108 and the recording medium 111, one or more clearance actuators 114 (e.g., heaters) are formed in the read/write head 102. A current applied to the heater 114 induces a local protrusion which varies the clearance. The amount of current applied to the heater 114 may vary based on which of the read/write transducers 108 are in use, and may also be adjusted to account for irregularities in the media surface 110, changes in ambient temperature, location of the read/write head 102 over the medium 111, etc.

A controller 118 is coupled to the read/write transducers 108, as well as other components of the read/write head 102, such as heaters 114, sensors, etc. The controller 118 may be part of general- or special-purpose logic circuitry that controls the functions of a storage device that includes at least the read/write head 102 and recording medium 111. The controller 118 may include or be coupled to a read/write channel 119 that include circuits such as preamplifiers, buffers, filters, digital-to-analog converters, analog-to-digital converters, decoders, encoders, etc., that facilitate electrically coupling the logic of the controller 118 to the signals used by the read/write head 102 and other components.

The illustrated read/write head 102 is configured as a HAMR device, and so includes additional components that form a hotspot 124 on the recording medium 111 near the read/write transducer 108. These components include a laser 120 (or other energy source) and a waveguide 122. The waveguide 122 delivers light from the laser 120 to components near the read/write transducers 108, such as a near-field transducer that emits a tightly focused stream of energy to form the hotspot 124. The read/write transducers 108 also include a magnetic pole that applies a magnetic field to the hotspot 124 and the surrounding area. Because of the high coercivity of the recording medium 111, only the hotspot 124 is affected by the magnetic field due to the material being heated above the Curie temperature. Therefore, the size and shape of the hotspot 124 affects the location of magnetic transitions written to the recording medium 111, which can affect the size and location of the bits of data defined by the transitions.

Figure 2:
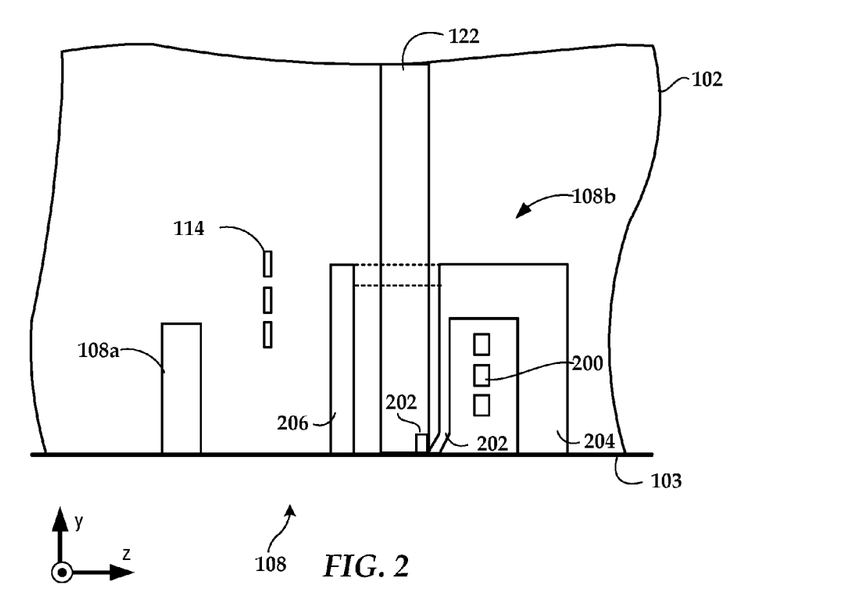
FIG. 2 is a view of a read and write transducers according to an example embodiment.

In FIG. 2, a block diagram illustrating a cross-sectional view of the read/write head 102 near the read/write transducers 108 according to an example embodiment. A read transducer 108a is located downtrack from a write transducer 108b. The read transducer 108a may be configured as a magnetoresistive stack (e.g., giant magnetoresistive, tunnel magnetoresistive, etc.) surrounded by magnetic shields. The write transducer 108b includes a coil 200 that, when energized, induces magnetic flux through a write pole 202 and return poles 204, 206. The aforementioned waveguide 122 delivers light to an NFT 202 located near the write pole 202.

Figure 3:
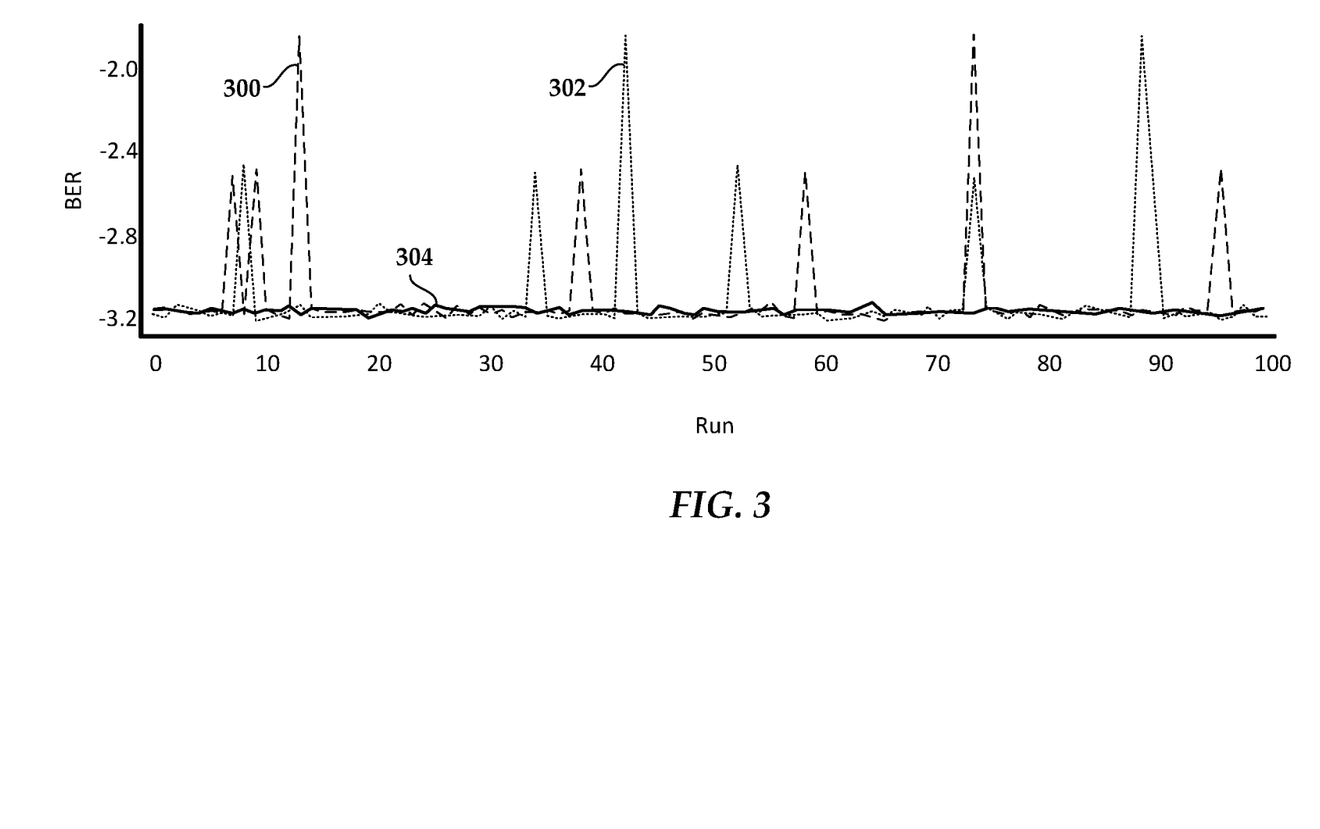
FIG. 3 is a graph showing reader instability in a drive according to an example embodiment.

As noted above, the read transducer 108a may become unstable in response to prior activation of the write transducer 108b. If this instability is discovered, e.g., spike in BER, then a subsequent activation of the write transducer 108b may remove the instability. In FIG. 3, a graph shows testing data for a hard drive according to an example embodiment. In this procedure, a first track is written to, after which a second, nearby track is read back and read-only BER for the second track is measured (e.g., via a soft-output Viterbi algorithm). This is repeated for 100 times for each of three different cases using different combinations write coil current (Iw) and laser activation current (Iop) during the writing part. Curve 300 is the BER for writes using normal levels of both Iw and Iop. Curve 302 is the BER for writes with normal Iw but zero Iop. Curve 304 is the BER for writes with normal Iop but zero Iw. It can be clearly seen that BER jumps for curves 300 and 302 where the write coil was activated. In some cases the BER jumps close 1.5 decade. The BER is stable for curve 304, which suggests the cause is the write coil inducing the instability, and not the laser.

Figure 4:
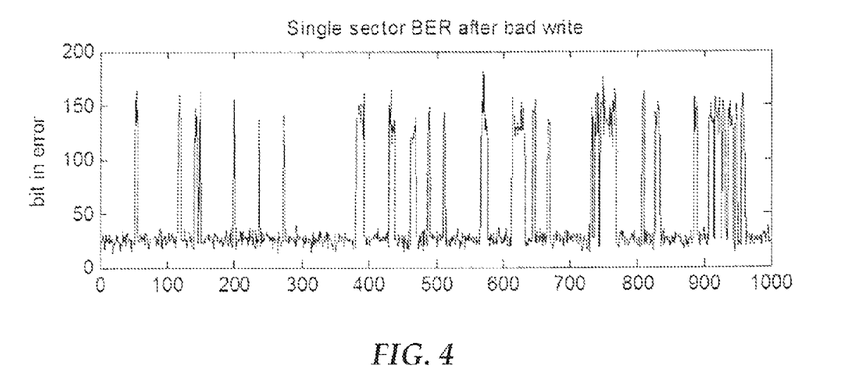
FIGS. 4 and 5 are graphs showing bits in error in a drive according to an example embodiment.
Figure 5:
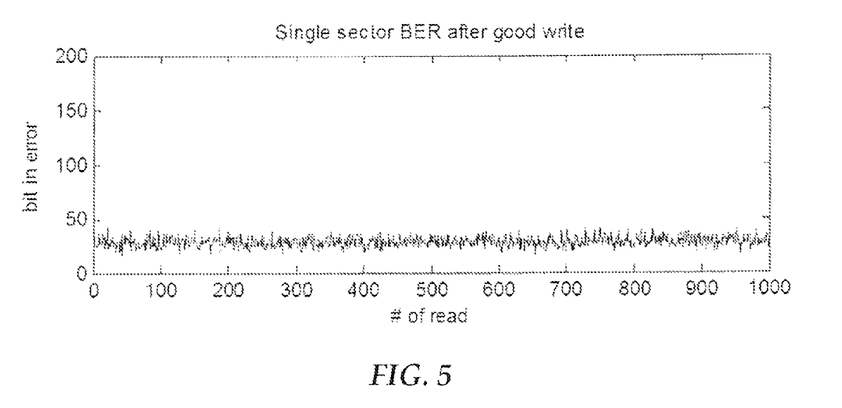

In FIGS. 4 and 5, graphs show single sector bits in error (BIE) of 1000 reads. The number of BIE jumping happens only after "bad write" that induces the reader problem. If it ends with "good write", the BER is low and stable until the next write. The time-domain signal for these reads don't show any traditional reader instability, such as glitches, sudden amplitude change, etc. As such, changing or optimizing the read channel has not been found to be effective in removing BER peaks caused by reader instability.

Figure 6:
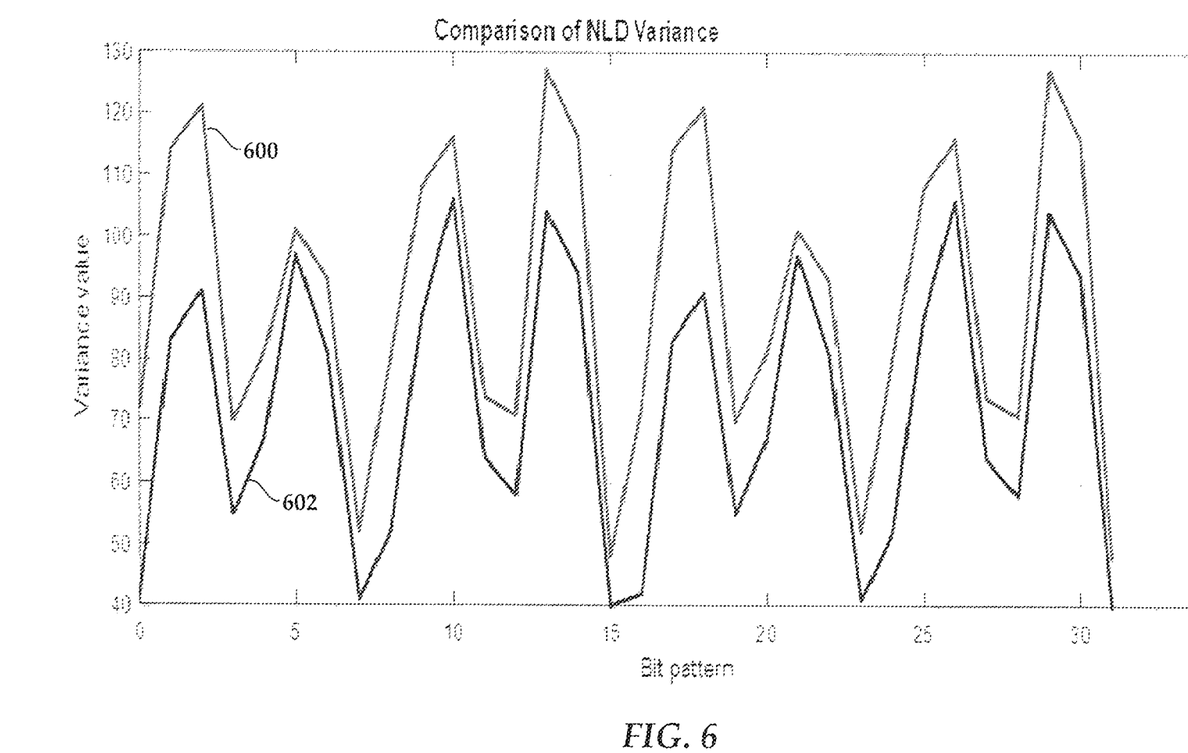
FIG. 6 is a graph showing non-linear detector noise variance in a reader according to an example embodiment.

The root cause of BER instability in this case is primarily due to polarity dependent noise increase induced from magnetic fields generate during a previous write. In FIG. 6, a graph shows non-linear detector (NLD, also referred to as a data-dependent detector) variance for the same sector for a bad read condition (curve 600) and good read condition (curve 602). The bad read has higher variance, which corresponds to worse signal-to-noise ratio.

Figure 7:
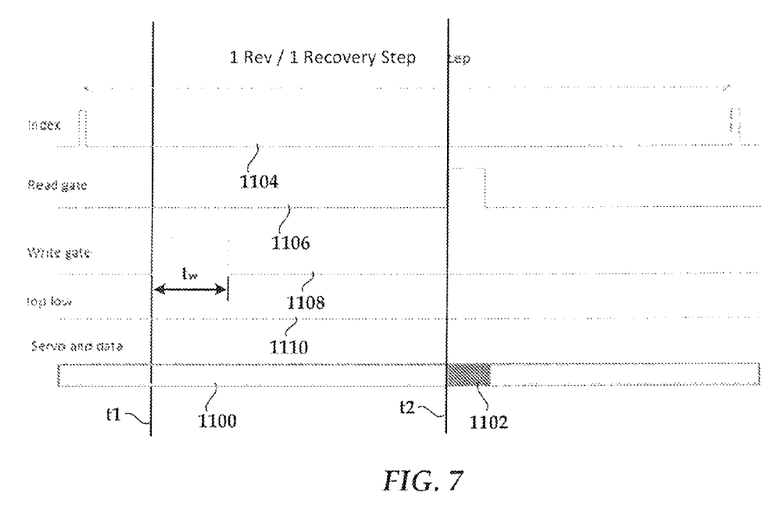
FIG. 7 is a signal diagram showing a recovery procedure according to an example embodiment.

The BER instability described above can last a long time (e.g., up to 200 ms), and so a directed error-recovery procedure may not recover the lost sector(s) because the procedure has time limitations associated with it. An efficient way to deal with this kind of failing mode is to turn on the magnetic writer (with laser turned off) to change reader mode quickly once a bad sector is encountered. The graph of FIG. 7 shows a read recovery procedure according to an example embodiment. Block 1100 represents a physical track of data, portion 1102 representing a bad sector (or other portion of a track). Note that the bad sector 1102 may be readable, however was marked as bad due to reader instability.

The recovery procedure takes place over one revolution, as indicated by track index signal 1104. Before approaching the sector 1102 at time t1, the write gate is turned on, and remains on for time $t_w$, as seen in signal 1108. This results in a DC signal applied to the magnetic writer for $t_w$, although an AC signal (e.g., 1T, 2T, etc.) may be used instead of or in addition to a DC signal. The time $t_w$ of the write may be short, for example, over a single sector. As indicated by signal 1110, the laser current Iop is at a low value, e.g., zero. Note that the laser may still have a small bias current Ibias applied that keeps the laser at an operating point where the laser may be more quickly activated than if no current was applied. In such a case, the total amount of current applied to cause laser to emit at the recording level is Ibias+Iop. When Iop is low or zero, the application of current 1108 to the magnetic writer at time t1 can occur over data and/or servo sectors without overwriting data. The coercivity of a HAMR medium is high enough that the magnetic field from the writer is insufficient to change magnetic orientation of the medium without the heat provided by the laser.

After the write current 1108 is applied and then turned off, the sector is read again at time t2 as indicated by signal 1106. Because the length of write is short, there is enough time to do both the write at t1 and read at t2 inside one revolution. Some amount of time will have elapsed when performing the first read and determining the error, in which case it may be possible in two revolutions or less to perform the initial read, determine the error, perform the write at t1 and read at t2. This can be incorporated into existing error recovery procedures. For example, some existing procedures may involve hundreds of steps, and the recovery shown in FIG. 7 can be done in a small number of steps that do not significantly increase the time of the recovery procedure if added.

The procedures described herein may be used for other operations besides recovery from write-induced polarity noise increase. For example, the procedure may be used for other kinds of reader instability whether or not induced by writing. In order to determine susceptibility of a particular read/write head to these types of instabilities, metrics can be used to help detect write inducing polarity dependent noise increase issue. For example, an adapted NLD variance can be compared to a baseline and/or results of a head health assessment test can be used. These metrics can be used to determine whether to apply the write without laser during recovery, as well as other parameters such as the length of the write, the time between the write and the subsequent re-read, the number of write operations (e.g., multiple writes may be performed along the same track before attempting to re-read) etc.

Figure 8:
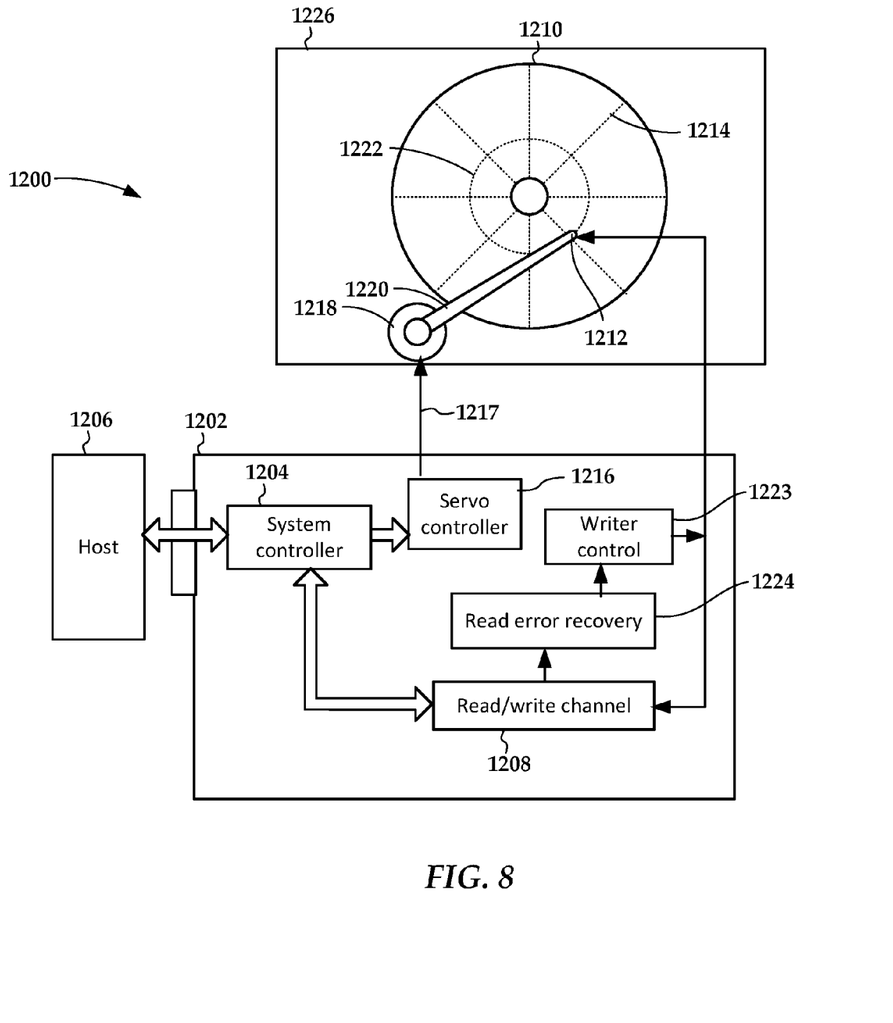
FIG. 8 is a block diagram of an apparatus according to an example embodiment.

In FIG. 8, a block diagram illustrates an apparatus 1200 according to an example embodiment. Control logic circuit 1202 of the apparatus 1200 includes a system controller 1204 that processes read and write commands and associated data from a host device 1206. The host device 1206 may include any electronic device that can be communicatively coupled to store and retrieve data from a data storage device, e.g., a computer, peripheral card, etc. The system controller 1204 is coupled to a read/write channel 1208 that reads from and writes to a surface of a magnetic disk 1210.

The read/write channel 1208 generally converts data between the digital signals processed by the system controller 1204 and the analog signals conducted through one or more read/write heads 1212 during read operations. The read/write channel 1208 may also send control signals to the read/write head 1212 and receive sensor signals from the read/write heads 1212. To facilitate the read operations, the read/write channel 1208 may include analog and digital circuitry such as preamplifiers, filters, decoders, digital-to-analog converters, timing-correction units, etc. The read/write channel 1208 also provides servo data read from servo wedges 1214 on the magnetic disk 1210 to a servo controller 1216. The servo controller 1216 uses these signals to provide a voice coil motor control signal 1217 to a VCM 1218. The VCM 1218 rotates an arm 1220 upon which the read/write heads 1212 are mounted in response to the voice coil motor control signal 1217.

Data within the servo wedges 1214 is used to detect the location of a read/write head 1212 relative to the magnetic disk 1210. The servo controller 1216 uses servo data to move a read/write head 1212 to an addressed track 1222 and block on the magnetic disk 1210 in response to the read/write commands (seek mode). While data is being written to and/or read from the disk 1210, the servo data is also used to maintain the read/write head 1212 aligned with the track 1222 (track following mode).

The apparatus 1200 uses HAMR, and therefore the read/write heads 1212 include an energy source (e.g., laser diode) that heats the magnetic disk 1210 when recording. A writer control module 1223 (e.g., via read/write channel 1208) sends a current to activate the lasers together with a magnetic writer current (e.g., write coil current) when recording. In some instances, the write coil current may trigger instability in a read transducer of the read/write heads 1212. This results in an unrecoverable error for at least one sector detected by a read error recovery module 1224.

The read error recovery module 1224 directs the read/write head 1212 (e.g., via servo controller 1216) to again traverse a track on which the unrecoverable error was discovered. Before reaching the at least one sector on the track which exhibited the error, the read error recovery module 1224 activates the magnetic writer of the read/write head 1212 without heating the heat-assisted recording medium via the energy source. The activating of the magnetic writer does not write to the track due to there being no heating of the recording medium by the energy source. Therefore, the writer can be activated when traversing user data and/or servo data recorded onto the track without overwriting the data. Before reaching the at least one sector, the read error recovery module 1224 deactivates the magnetic writer (e.g., Iw=0) and re-reads the at least one sector.

Figure 9:
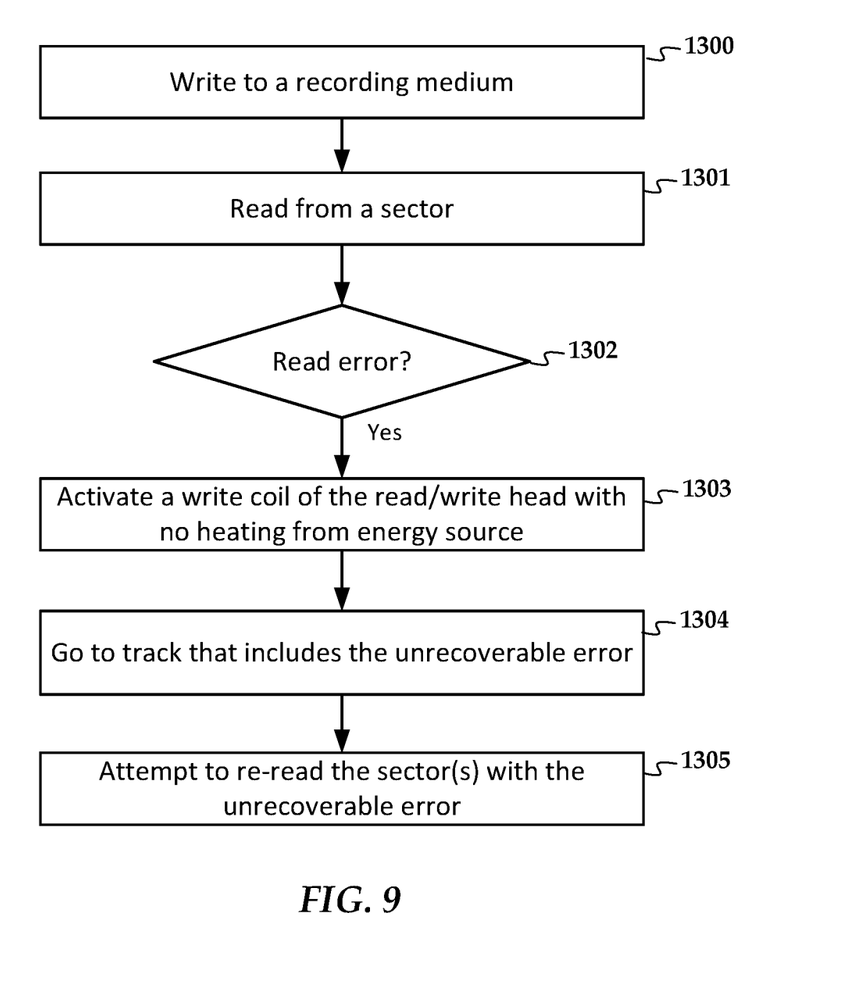
FIG. 9 is a flowchart of a method according to an example embodiment.

In reference now to FIG. 9, a flowchart illustrates a method according to an example embodiment. The method involves writing 1300 to a recording medium using a read/write head with an energy source that heats the media during the writing. Subsequent to the writing 1300, a sector is read 1301. Note that the previous writing may have been to a different location than the read 1301. In this example, the writing 1300 induces an instability in a read transducer, although in other examples the instability may be induced by other sources. The instability manifests itself as a read error 1302 (recoverable or unrecoverable) in a data sector (or servo sector) when reading 1301.

In response to determining 1302 the read error, a write coil of the read/write head is activated 1303. This activation 1303 may occur on any part of the recording medium that stores data, including a target track that includes the data sector that exhibited the error. The energy source does not heat the recording medium during the activation 1303 of the write coil. The activation 1303 of the write coil removes a magnetic instability of a read transducer of the read/write head without overwriting data when the write coil is activated 1304. The read head goes 1304 to the target track, which may involve a seek if the read/write head moved off of the target track after detecting the error 1302. If the error 1302 is detected on the target track before read/write head moves off of the target track, the servo system cause the head to remain on the target track. While traversing the track, the data sector is re-read 1305.

The various embodiments described above may be implemented using circuitry, firmware, and/or software modules that interact to provide particular results. One of skill in the arts can readily implement such described functionality, either at a modular level or as a whole, using knowledge generally known in the art. For example, the flowcharts and control diagrams illustrated herein may be used to create computer-readable instructions/code for execution by a processor. Such instructions may be stored on a non-transitory computer-readable medium and transferred to the processor for execution as is known in the art. In other embodiments, custom logic circuits may be constructed/configured to provide this functionality. The structures and procedures shown above are only a representative example of embodiments that can be used to provide the functions described hereinabove.

The foregoing description of the example embodiments has been presented for the purposes of illustration and description. It is not intended to be exhaustive or to limit the embodiments to the precise form disclosed. Many modifications and variations are possible in light of the above teaching. Any or all features of the disclosed embodiments can be applied individually or in any combination are not meant to be limiting, but purely illustrative. It is intended that the scope of the invention be limited not with this detailed description, but rather determined by the claims appended hereto.

What is claimed is:

1. A method comprising:
   writing to a recording medium using a read/write head comprising a write coil and an energy source, the energy source heating the recording medium during the writing;
   determining a read error in a sector when reading via a read transducer of the read/write head, the reading occurring subsequent to the writing; and
   while traversing a part of the recording medium that includes data, activate the write coil before attempting to re-read the sector, the energy source not heating the recording medium sufficiently to change a state of the data during the activation of the write coil, the activation of the write coil removing a magnetic instability of the read transducer.

2. The method of claim 1, wherein a bias current is applied to the energy source during the activation of the write coil, wherein the bias current does not result in energy being emitted from the energy source.

3. The method of claim 1, wherein the write coil is activated while traversing user data.

4. The method of claim 1, wherein the write coil is activated while traversing servo data.

5. The method of claim 1, wherein the part of the recording medium comprises a track that includes the sector.

6. The method of claim 1, wherein the determining of the read error, the activating of the write coil, and the attempting to re-read the sector occur in two revolutions or less of the recording medium.

7. The method of claim 1, wherein the activating of the write coil and the attempting to re-read the sector occur in one revolution or less of the recording medium.

8. The method of claim 1, further comprising determining that a level of data-dependent noise variance associated with the read transducer exceeds a threshold, and wherein the activation of the write coil is performed if the level exceeds the threshold.

9. The method of claim 1, further comprising determining a level of data-dependent noise variance associated with the read transducer, and wherein a duration of the activation of the write coil is selected based on the level.

10. The method of claim 1, further comprising determining a level of data-dependent noise variance associated with the read transducer, and wherein a time between deactivating the write coil and re-reading the sector is selected based on the level.

11. A method comprising:
    reading from a track of a heat-assisted recording medium via a read/write head;
    determining at least one sector of the track is unrecoverable, and in response thereto, performing an error recovery procedure involving:
    while traversing a part of the heat-assisted recording medium that stores data, activating a magnetic writer of the read/write head without sufficiently heating the heat-assisted recording medium via an energy source such that the activating of the magnetic writer does not change a state of the data;
    before reaching the at least one sector, deactivating the magnetic writer; and
    re-reading the at least one sector.

12. The method of claim 11, wherein a bias current is applied to the energy source during the activation of the magnetic writer, wherein the bias current does not result in energy being emitted from the energy source.

13. The method of claim 11, wherein the magnetic writer is activated while traversing user data.

14. The method of claim 11, wherein the magnetic writer is activated while traversing servo data.

15. The method of claim 11, further comprising determining that a level of data-dependent noise variance associated with a reader of the read/write head exceeds a threshold, and wherein the error recovery procedure is performed if the level exceeds the threshold.

16. The method of claim 11, further comprising determining a level of data-dependent noise variance associated with a reader of the read/write head, and wherein at least one of a duration of the activating of the magnetic writer and a time between deactivating the magnetic writer and re-reading the at least one sector is selected based on the level.

17. An apparatus comprising:
    interface circuitry configured to communicate with a read/write head that reads from and writes to a heat-assisted recording medium, the read/write head comprising an energy source that heats the recording medium during writing, a read transducer, and a write coil; and
    a controller coupled to the interface circuitry and configured to:
    determine a read error in a sector when reading via the read transducer, the read error due to a magnetic instability of the read transducer; and
    while traversing a track that includes data, activate the write coil to remove the magnetic instability before attempting to re-read the sector, the energy source not heating the recording medium sufficiently to change a state of the data during the activation of the write coil.

18. The apparatus of claim 17, wherein the write coil is activated while traversing one or both of user data and servo data written to the track, the user data and servo data not being overwritten during the activating of the write coil due to there being no heating of the recording medium from the energy source.

19. The apparatus of claim 17, wherein the determining of the read error, the activating of the write coil, and the attempting to re-read the sector occur in two revolutions or less of the recording medium.

20. The apparatus of claim 17, wherein the activating of the write coil and the attempting to re-read the sector occur in one revolution or less of the recording medium.

* * * * *